UNITED STATES PATENT OFFICE.

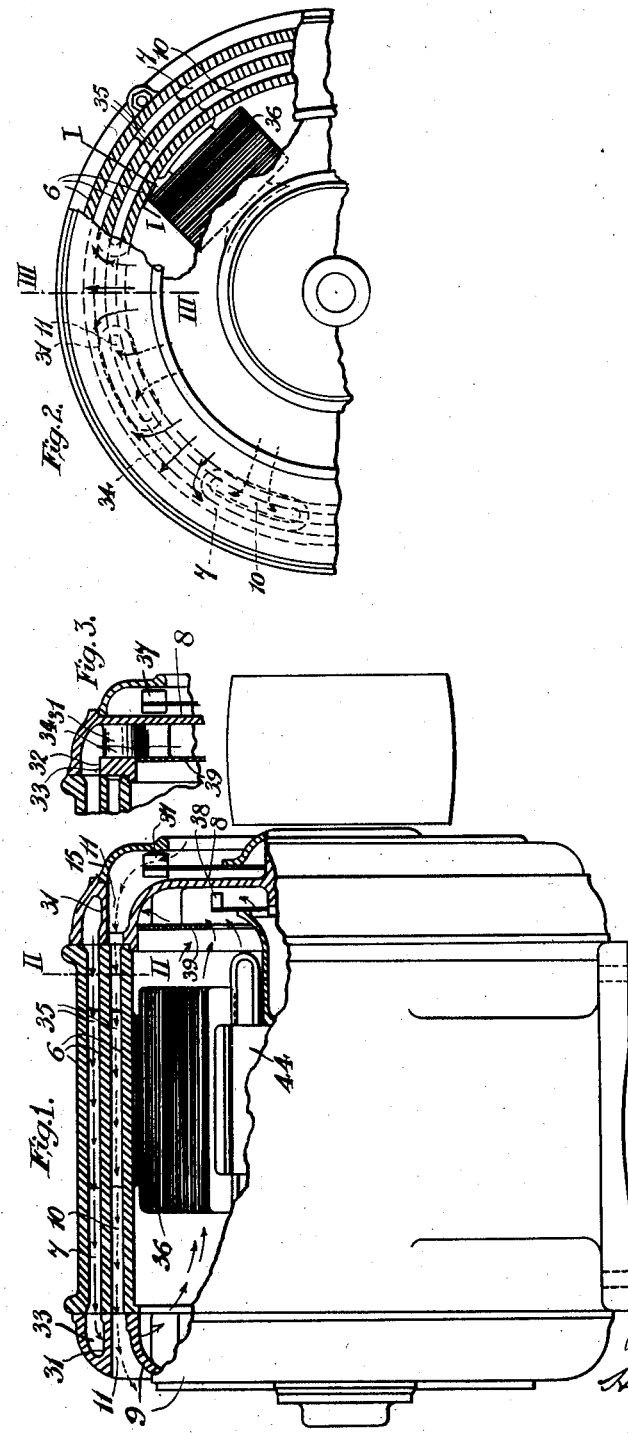

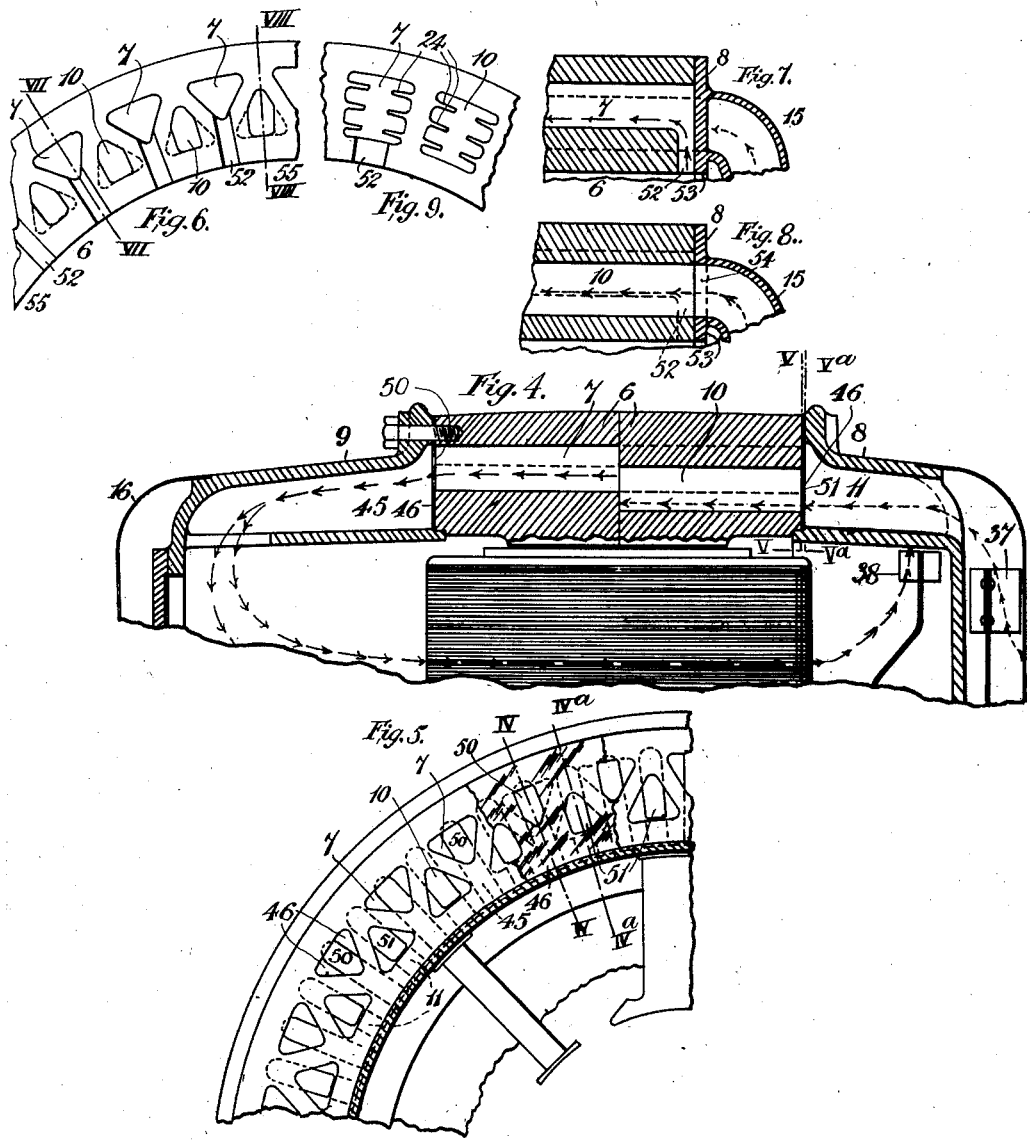

PAUL ALPHONSE HUBERT MOSSAY AND HENRY CHARLES EDWARD JACOBY, OF LONDON, ENGLAND.

COOLING ARRANGEMENT FOR DYNAMO-ELECTRIC MACHINES.

1,342,179.     Specification of Letters Patent.     Patented June 1, 1920.

Application filed April 19, 1918. Serial No. 229,489.

*To all whom it may concern:*

Be it known that we, PAUL ALPHONSE HUBERT MOSSAY and HENRY CHARLES EDWARD JACOBY, subjects of the King of the Belgians and the King of Great Britain, respectively, residing at London, England, have invented certain new and useful Improvements in Cooling Arrangements for Dynamo-Electric Machines, of which the following is a specification.

This invention relates to improvements in means for cooling dynamo electric machines, for example, motors of the totally inclosed type.

In a co-pending application of Paul A. H. Mossay Serial No. 214,441, filed January 30, 1918, it is proposed to circulate the hot internal air of the machine through channels beyond the field periphery in contact with the metallic walls of other channels through which cold fluid, such as air from the surrounding atmosphere, is passed, for the purpose of obtaining an increased cooling surface without unduly increasing the dimensions of the machine so that the output is increased per unit of area and a saving is effected in material and labor in the manufacture of the machine.

According to the present invention the channels are formed directly in the yoke or magnet ring. The form of the channels and their disposition relative to one another and to the interior and exterior of the magnet ring are capable of variation. Several embodiments of the invention are hereinafter described with reference to the accompanying drawings in which—

Figure 1 is a part sectional side elevation of a direct current motor having a magnet ring formed with annular air channels the section being taken on line I—I Fig. 2.

Fig. 2 is a half end elevation corresponding to Fig. 1, partly in section on the line II—II Fig. 1.

Fig. 3 is a detail section on the line III—III Fig. 2.

Figs. 4 and 5 illustrate a portion of magnet ring formed with channels of triangular cross section, Fig. 4 being a side sectional elevation, the left and right hand sections of which are taken on lines IV—IV and IV$^a$—IV$^a$ Fig. 5, and, Fig. 5 being an end sectional elevation partly on the line V—V and partly on the line V$^a$—V$^a$ Fig. 4.

Fig. 6 is an end view of a fragment of another form of magnet ring having channels of triangular cross section.

Figs. 7 and 8 are side sectional elevations on lines VII—VII and VIII—VIII, Fig. 6 and Fig. 9 is an end elevation of a fragment of magnet ring formed with channels of rectangular cross section the partitions between which are provided with webs to increase the cooling surface.

In all the figures similar reference numerals represent corresponding parts, and the dotted and full arrows represent the course of the cold and hot air respectively. In the embodiment of the invention shown in Figs. 1 to 3, which relate to an inclosed direct current motor, the magnet ring or yoke 6 is a casting formed with separate annular channels 7 and 10 respectively for the hot internal air of the machine and the cooling fluid, air in this example. The motor is closed at the ends by end shields 8 and 9, which being dished connect the outer channel 7 to the interior of the machine. Connection between the inner channel 10 and the interior of the machine is prevented by rings 32 joined to the shields 8 and 9 by hollow bosses 31, the interiors of which form ducts 11 communicating with the outer air and with the inner cold air channel 10. The spaces 33 and 34 between each ring 32 and its shield 8 or 9 together form a duct between the interior of the machine and the outer annular hot air channel 7. The portions of the magnet ring 6 divided by the channels 7 and 10 are connected at intervals by bosses 35 adjacent to the pole pieces 36. A fan 38 and a baffle 39 are provided to induce circulation of the internal hot air through the ducts 34, 33 in the shield 8, the channel 7 and thence after being cooled in the channel 7 being drawn into the machine again through ducts 33 and 34 in the shield 9, passing therein across the armature or rotor 44 and stator pole pieces 36. A fan 38 within the end cover 15 propels cold air through the ducts 11 in the shield 8, the channel 10 and out through the ducts 11 in the shield 9. One advantage of the form of the invention described is that the magnet ring 6 and end shields 8 and 9 are simple castings only requiring machining at their adjacent faces. This in addition to the efficient cooling of the machine enables the inclosed motor to be constructed of very compact form and economically as compared with inclosed motors hitherto constructed.

In the form of the invention illustrated by Figs. 4 and 5, the channels 7 for the hot internal air of the machine and the channels 10 for cold air are very numerous and are formed in the yoke or magnet ring 6. They are of triangular form in cross section and are alternately arranged close together, so that the hot air channels 7 are more remote from the interior of the machine than the cold air channels 10, and have walls of large area adjacent to the exterior of the machine, whereas the cold air channels 10 are nearer to and have walls of large area adjacent to the interior of the machine. The channels 7 and 10 are separated from one another by walls of heat conductive material, the magnet ring being of iron or steel, so that heat exchange can occur between the hot and cold air in the channels as well as between the hot air in the channels 7 and the surrounding atmosphere. A very large total conductive or cooling surface is obtained without unduly increasing the size of the machine casing which is formed by the magnet ring 6, and end shields 8 and 9. In practice the size of the machine may be considerably decreased due to the efficient cooling enabling a high electrical efficiency of the machine being maintained. The end shields 8 and 9 have openings 11 forming ducts between the outer cool atmosphere and the cold air channels 10, and other ducts 45 between the interior of the machine and the hot air channels 7. Rings 46 are interposed between the end shields 8 and 9 and the adjacent ends of the yoke or magnet ring 6. The rings 46 have two series of holes 50, 51, connecting the hot air channels 7 and cold air channels 10 respectively to the ducts 45 and 11. The rings 46 are dispensed with in the modification illustrated by Figs. 6 to 8 wherein the ends of the channeled yoke 6 have recesses 52 for forming ducts between the hot air channels 7 and the interior of the machine. Webs 55 are preferably formed at the ends of the channels 10 to strengthen the casting adjacent to the recesses 52. The end shields 8 and 9 each have a ring 53 which has holes 54 forming communications between the atmosphere and the cold air channels 10. The holes 54 are guarded by an end clamp 15 as in the forms of the invention previously described.

In the further modification of the invention illustrated by Fig. 9 the channels 7 for the hot internal air of the machine and the channels 10 for the cold air are of rectangular form and alternately arranged. The division walls between the channels are provided with webs 24 to increase the conductive surface. Otherwise this form of the invention is similar to that described with reference to Figs. 6 to 8.

We claim:—

1. An inclosed dynamo electric machine having a magnet ring traversed by two series of separate channels, one series for the passage of the hot internal air of the machine and the other series for cooling fluid, and means for circulating the hot internal air of the machine and cooling fluid through the respective channels in said ring.

2. An inclosed dynamo electric machine having a casing comprising a magnet ring having two series of channels formed therein for the passage of the hot internal air of the machine and for cooling fluid, said casing having separate ducts connecting one of said series of separate channels to the interior of the machine and the other of said series of channels to the outside of the machine respectively, and means for circulating the hot internal air and external cooling fluid through the respective ducts and channels.

3. An inclosed dynamo electric machine having a casing comprising a magnet ring and end shields, said magnet ring having two series of channels formed therein, and the end shields on said casing having ducts connecting one series of channels with the exterior of the machine, and means for circulating the internal air of the machine through the other series of channels.

4. An inclosed dynamo electric machine having a casing comprising a magnet ring having two series of channels formed therein, the channels of one series alternating with the channels of the other series, means for circulating the internal air of the machine through the channels of one series and means for passing cooling fluid through the channels of the other series.

5. An inclosed dynamo electric machine having a casing comprising a magnet ring having two series of channels of triangular cross section formed therein, the channels of one series alternating with the channels of the other series, means for circulating the internal air of the machine through the channels of one series and means for passing cooling fluid through the channels of the other series.

6. An inclosed dynamo electric machine having a casing comprising a magnet ring having two series of channels formed therein, the channels of one series alternating with the channels of the other series and being situated nearer to the exterior of the casing than those of the other series, means for circulating the internal air of the machine through the channels of one series and means for passing cooling fluid through the channels of the other series.

7. An inclosed dynamo electric machine having a casing comprising a magnet ring having two series of channels of triangular cross section formed therein, the channels of one series alternating with the channels of the other series, and being situated nearer to the exterior of the casing than those of the other series, means for circulating the internal air of the machine through the channels of one series and means for passing cooling fluid through the channels of the other series.

8. An inclosed dynamo electric machine having a magnet ring having channels formed therein, said channels being of triangular cross section, said channels alternately presenting the bases of their triangular sections toward the exterior and interior of said magnet ring, means for circulating the internal air of the machine through the former channels and means for passing cooling fluid through the latter channels, substantially as and for the purpose hereinbefore set forth.

9. An inclosed dynamo electric machine having a magnet ring provided with separate series of channels for the passage of cooling fluid and for the internal air of the machine, said channels being of polygonal cross section, the channels for cooling fluid nearer the interior of the casing presenting thereto larger conductive surfaces than those of the channels for the internal air, and the walls of the last mentioned channels nearer the exterior of the casing presenting thereto larger conductive surfaces than those of the channels for cooling fluid.

10. An inclosed dynamo electric machine having a magnet ring provided with separate series of channels for the passage of cooling fluid and for the internal hot air of the machine, the channels for cooling fluid having walls directly adjacent to the interior of the magnet ring and the hot air channels having walls directly adjacent to the exterior of the magnet ring.

In testimony whereof we have signed our names to this specification in the presence of two subscribing witnesses.

PAUL ALPHONSE HUBERT MOSSAY.
HENRY CHARLES EDWARD JACOBY.

Witnesses:
A. W. MATHYS,
G. I. BRIDGES.